(12) United States Patent
Klein et al.

(10) Patent No.: US 11,410,177 B1
(45) Date of Patent: Aug. 9, 2022

(54) SYSTEM AND METHOD FOR FACILITATING INVESTIGATION OF EXPENSE CARD FRAUD

(71) Applicant: ZONAR SYSTEMS, INC., Seattle, WA (US)

(72) Inventors: Chad Klein, Snoqualmie Pass, WA (US); Eric Perser, Gig Harbor, WA (US)

(73) Assignee: Zonar Systems, Inc., Seattle, WA (US)

( * ) Notice: Subject to any disclaimer, the term of this patent is extended or adjusted under 35 U.S.C. 154(b) by 89 days.

(21) Appl. No.: 16/036,466

(22) Filed: Jul. 16, 2018

Related U.S. Application Data

(60) Provisional application No. 62/537,417, filed on Jul. 26, 2017, provisional application No. 62/535,512, filed on Jul. 21, 2017.

(51) Int. Cl.
| | |
|---|---|
| *G06Q 20/40* | (2012.01) |
| *H04W 4/40* | (2018.01) |
| *G07C 5/00* | (2006.01) |
| *H04W 4/029* | (2018.01) |

(52) U.S. Cl.
CPC ......... *G06Q 20/4016* (2013.01); *G07C 5/008* (2013.01); *H04W 4/029* (2018.02); *H04W 4/40* (2018.02)

(58) Field of Classification Search
CPC . G06Q 20/4016; G01C 21/3469; H04W 4/40; G08G 1/20
See application file for complete search history.

(56) References Cited

U.S. PATENT DOCUMENTS

| | | | |
|---|---|---|---|
| 7,353,396 B2 | 4/2008 | Micali et al. | |
| 8,171,524 B2 | 5/2012 | Micali et al. | |
| 8,577,810 B1 | 11/2013 | Dalit et al. | |
| 9,230,375 B2 | 1/2016 | Micali et al. | |
| 9,311,616 B2* | 4/2016 | Westerlage | G06Q 10/06315 |
| 9,441,977 B1* | 9/2016 | Harter | G07C 5/02 |
| 9,466,156 B2* | 10/2016 | Getchius | G06Q 10/06398 |
| 9,471,921 B1 | 10/2016 | Dalit et al. | |
| 2008/0035725 A1 | 2/2008 | Jambunathan et al. | |
| 2010/0070349 A1 | 3/2010 | Daems | |

(Continued)

FOREIGN PATENT DOCUMENTS

| | | |
|---|---|---|
| EP | 3136328 A1 | 3/2017 |
| EP | 2235690 B1 | 7/2018 |

(Continued)

*Primary Examiner* — Jay Huang

(57) ABSTRACT

In preferred embodiment, an analysis tool is provided to help a user quickly comb through a vast number of expense card purchases, to focus only on those where there is some indication that fraud could have been involved. These suspect purchases are those where there is a lack of correspondence between the location and time of any vehicle stop and the purchase record. Because the purchase record can be misleading regarding time and location, a lack of match is not a certain indication of fraud, but it does merit further investigation. The tool permits a user to set a time and distance window about each fuel purchase time and location, or to choose a best match algorithm. After a table showing the purchases and closest stops is returned, the user may, for any one of them, choose to view a map view showing vehicle stops and purchase location.

18 Claims, 4 Drawing Sheets

(56) References Cited

U.S. PATENT DOCUMENTS

| | | |
|---|---|---|
| 2010/0287038 A1 | 11/2010 | Copejans |
| 2012/0023022 A1 | 1/2012 | Carroll et al. |
| 2013/0332251 A1 | 12/2013 | Ioannidis et al. |
| 2015/0154592 A1 | 6/2015 | Ioannidis et al. |
| 2015/0170151 A1* | 6/2015 | Lamb ................. G06Q 30/0269 705/21 |
| 2016/0180614 A1 | 6/2016 | Micali et al. |
| 2017/0236101 A1* | 8/2017 | Irudayam ........... G06Q 20/3223 382/140 |
| 2017/0243484 A1* | 8/2017 | Li .................... G08G 1/096725 |
| 2018/0374279 A1* | 12/2018 | Siegl ................... G08G 1/0175 |

FOREIGN PATENT DOCUMENTS

| | | |
|---|---|---|
| WO | WO2003088166 | 10/2003 |
| WO | WO2009090515 | 7/2009 |
| WO | WO2016083778 | 6/2016 |

\* cited by examiner

SYSTEM AND METHOD FOR FACILITATING INVESTIGATION OF EXPENSE CARD FRAUD

RELATED APPLICATIONS

This application claims benefit to provisional application Ser. No. 62/535,512 filed on Jul. 21, 2017, and provisional application Ser. No. 62/537,417 filed on Jul. 26, 2017, which are incorporated by reference as if fully set forth herein.

BACKGROUND

Businesses and government entities that supply their employees with expense cards, which may also be referred to "fuel cards" are likely to have at least some fraudulent charges made against these cards. For example, an expense card may be used to purchase fuel for a driver's personal vehicle, or the vehicle of a friend of the driver. There have even been instances where a person has paid the driver some percentage of the value of fuel fraudulently obtained, so that both driver and fuel recipient benefit according to a nefarious arrangement.

Investigating transactions using human investigators can prove as expensive as the fuel theft. One method that could be used, for an operator that tracks its fleet vehicles and stores the data in a data repository accessible to investigators, would be to compare the purchase time and location with the times and locations for vehicle stops stored in the repository, to find cases where there is no match. To review every transaction, for a large operation such as a state government or a trucking company owning one thousand trucks, would require so many investigators that their pay would soon devour the savings made by stopping the fraud.

Efforts are complicated by fuel stations that associate a time to the transaction record that reflects the time when the transaction record was uploaded to a remote station, which may be some hours after the actual purchase. This practice is particularly common in remote areas that are poorly served by telecommunications infrastructure. Another complication is that the location provided on the transaction is typically provided as a street address, as opposed to the latitude and longitude coordinates provided in the fleet vehicle location data. Adding further to the challenge is the fact that the address listed may be for a business office that is not co-located with the fueling station. Clearly, some better way of focusing the efforts of investigators is needed.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In preferred embodiment, an analysis tool is provided to a user to help that user quickly comb through the vast number of purchases, to focus only on those where there is some indication that fraud could have been involved. These suspect purchases are those where there is a lack of correspondence between the location and time of any vehicle stop, for the vehicle on record as having visited the purchase venue (typically a fuel station), and the purchase record. Because the purchase record can be misleading regarding time and location, a lack of match is not a certain indication of fraud, but it does merit further investigation. The tool permits a user to set a time and distance window about each fuel purchase time and location, or to choose a best match algorithm. After a table showing the purchases and closest stops is returned, the user may, for any one of them, choose to view a map view showing vehicle stops and purchase location.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

In the context of this application, the term "expense card" will encompass fuel cards, debit cards, credit cards and include any card that can be used to make a purchase. The terms "purchase time" and "purchase location" reference the time and location listed on the purchase record, which might also be termed a "purchase receipt."

In a preferred embodiment, the present invention may take the form of a method and system for matching a vehicle stop location with a purchase record. Although the purchase record is typically a fuel purchase record, the purchase record contains a product field and could include other types of products that could be purchased by a fuel card, or some other type of expense card. In practice, a set of purchase records may be entered essentially simultaneously, with each treated the same way, sequentially.

Figure 5:
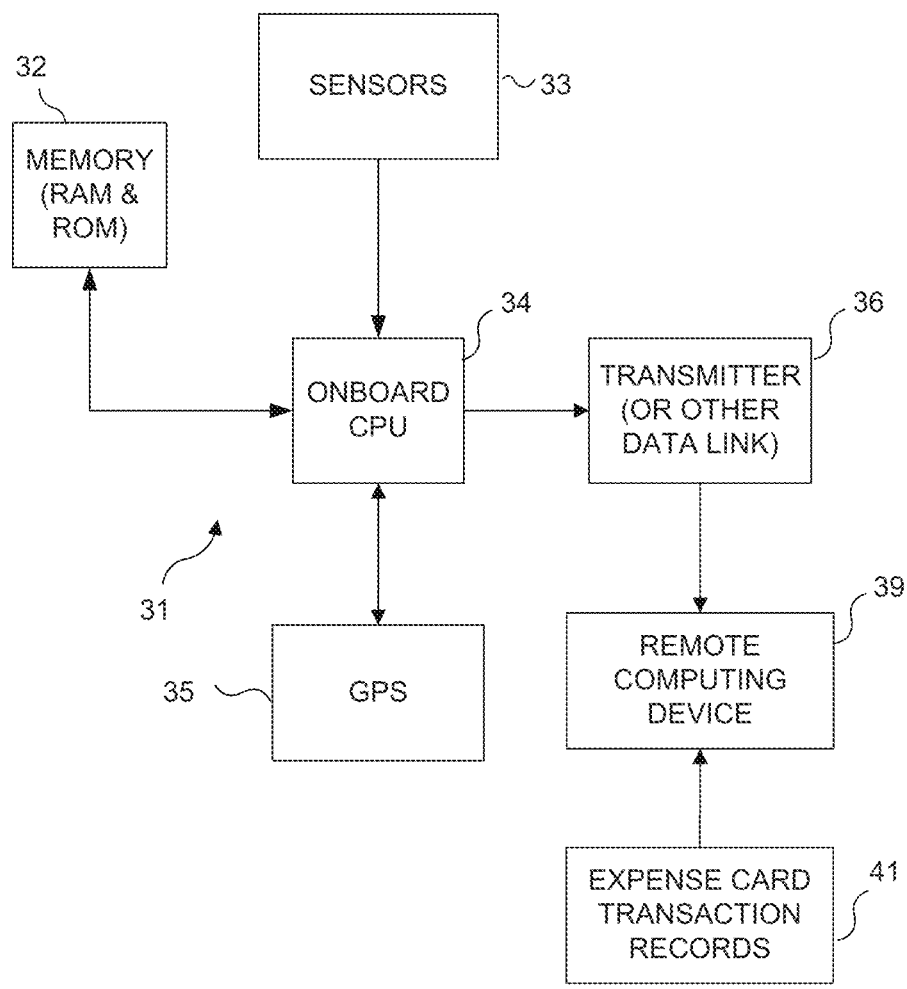
FIG. 5 is a block diagram of a system in which the method of claim 1 can be implemented.

Referring to FIG. 5, this system and method are typically implemented as part of a system 31 in which vehicles in a fleet are constantly tracked and their locations over time stored in a data repository maintained on computer readable media. A computer 39 having typical array of transitory and non-transitory memory is programmed to implement the method 10 (FIG. 1), by reading in a list of electronic purchase records 41 and accessing the repository of location tracking to find the vehicle stops, for the vehicle associated with the purchase request, that may match the purchase record. The results are typically displayed to a user on a computer display, so that the user can use a computer keyboard to select a particular record for further analysis.

The purchase records are typically received, over the Internet, as a table of comma separated values, delivered as an attachment to an Email, or downloaded from a website maintained by a supplier of expense cards.

Figure 1:
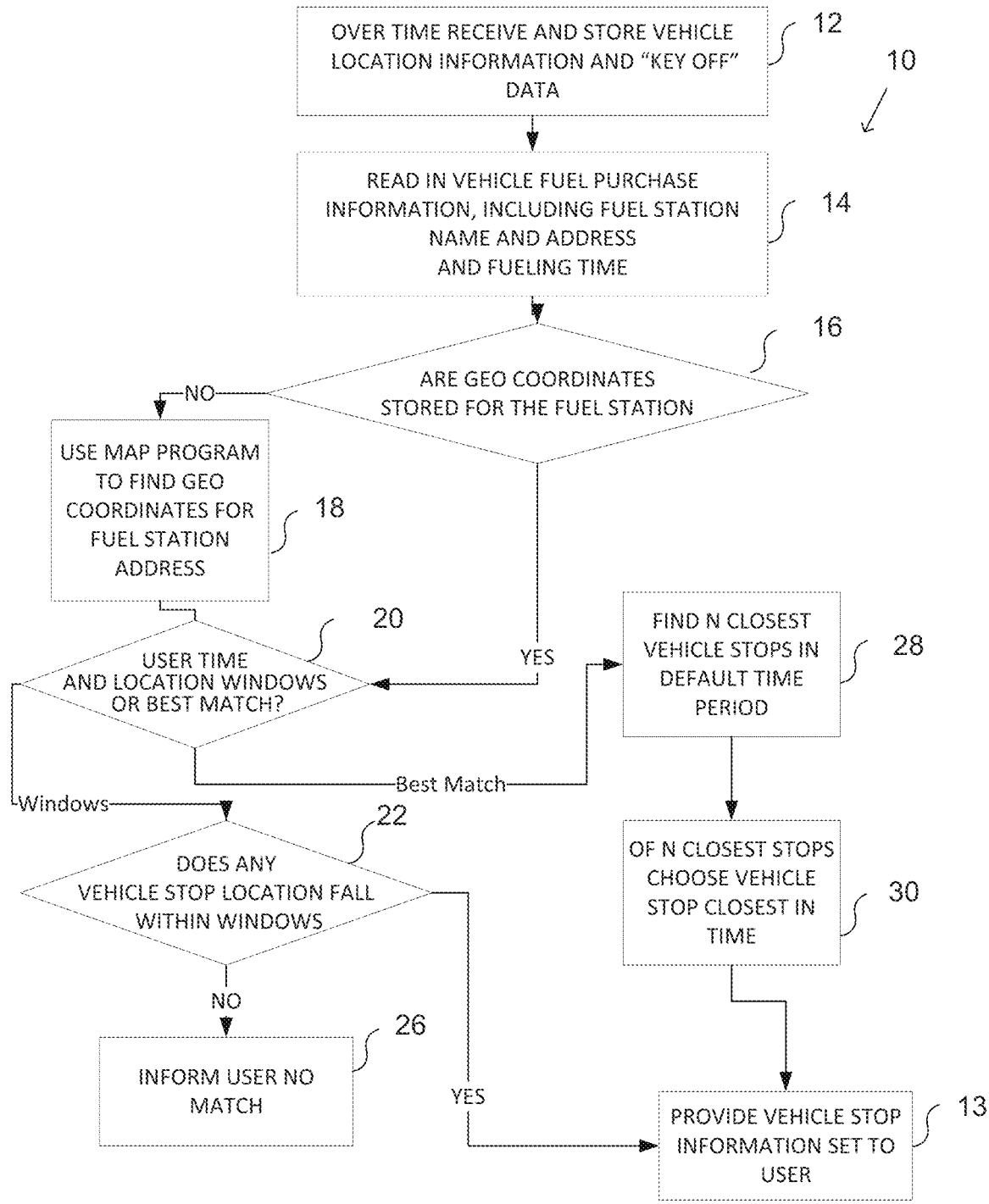
FIG. 1 is a flow chart showing the processing for a single vehicle purchase according to one embodiment of the present invention.

Referring to FIGS. 1 and 5, as noted, the above method 10 takes place in a system 31 where vehicles are tracked over time, and a data repository is maintained in computer memory of vehicle locations over time (block 12). This includes instances where a vehicle was stationary for longer than a given amount of time (1 minute, for example). Information from sensors 33 is also made available an onboard CPU 34, which can shunt some or all of this data to computing device 39. Of particular interest in this application is the ignition key on/key off data item, which is sent to the onboard CPU 34 and from there to computing device 39. In a preferred embodiment, a "vehicle stop" as used below, is any "key off" event, as US regulations require that the vehicle engine be turned off during fueling. In an alternative preferred embodiment, a lack of movement for more than one minute is used to indicate a vehicle stop. In broad overview, if a vehicle stop location is found that fits the transaction record, information concerning the vehicle stop is made available to a human operator (block 13), who can decide to conduct further investigation as to whether the purchase was fraudulent or, typically when the fit is adequate, not investigate further and instead examine the next purchase record.

Although transaction records include a fueling station name that does uniquely identify a particular station, the location is identified by a street address. For many of the stations, however, a set of geo coordinates are already stored in the system 10, and associated with the station name. If there are no stored geo coordinates (decision box 16), however, third party map service, such as Bing® Maps or Google® Maps is accessed over the Internet, with the station address being sent to the map service and geo coordinates being extracted (block 18). Now that the information from the transaction record has been rendered into the same format as the vehicle location information, the system 10 either asks for user input or checks to see if user input has been received, indicating whether the vehicle stop locations should be compared against user indicated location and time window, as shown in FIG. 2, or whether a best match vehicle stop should be found, as shown in FIGS. 3A-3C (decision box 20).

Figure 2:
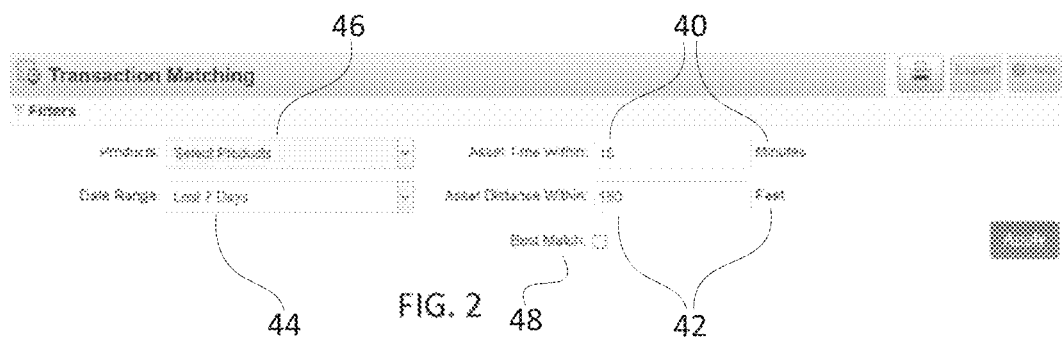
FIG. 2 shows a data entry window that a user can use to set the parameters of investigation, for the method of FIG. 1.

Referring to FIG. 2, in one embodiment, a user may set a time window 40 and a distance window 42 about each purchase record. This may be done for a set of purchase records falling within a date window 44, and for a particular product purchased, as set by dialogue box 46, to obtain an answer for each one as to whether or not a vehicle stop falls within the time and distance windows. In one embodiment, a single purchase record may be examined in this manner. The result(s) are provided to a human user (block 13), together with a data set (described below) which can aid a user in reviewing the vehicle stops. The purchases for which no vehicle stop fell within the time and distance windows are also provided (block 26) and may be the instances most likely to represent fraud. Typically, a set of results for purchases corresponding to the date range are provided as a list that the user can quickly scan for anomalies.

Figure 3A:
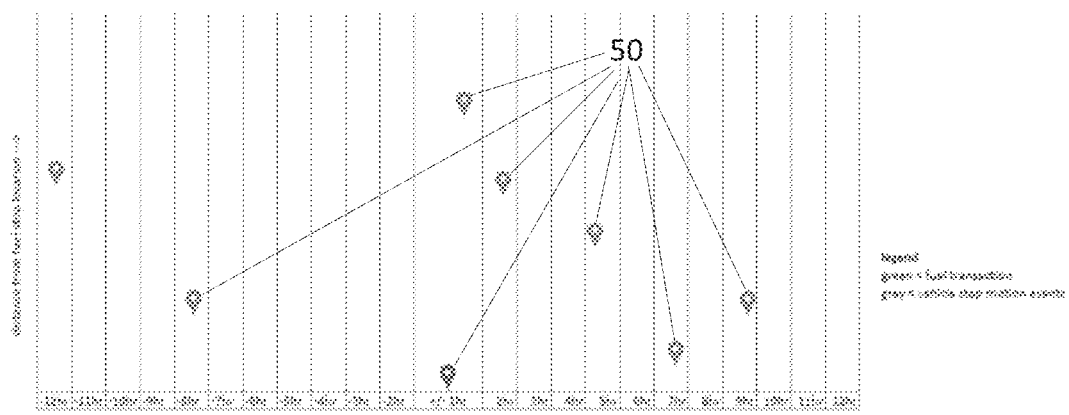
FIG. 3A is a graph of the distance and time difference of vehicle stops, relative to a purchase time and location.
Figure 3B:
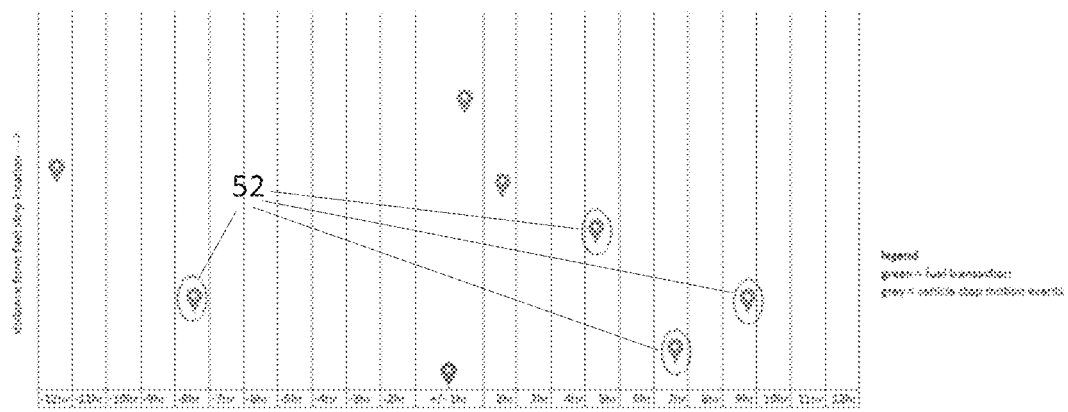
FIG. 3B is the graph of FIG. 3A, showing the selection of a set of vehicle stops, closest to the purchase location.
Figure 3C:
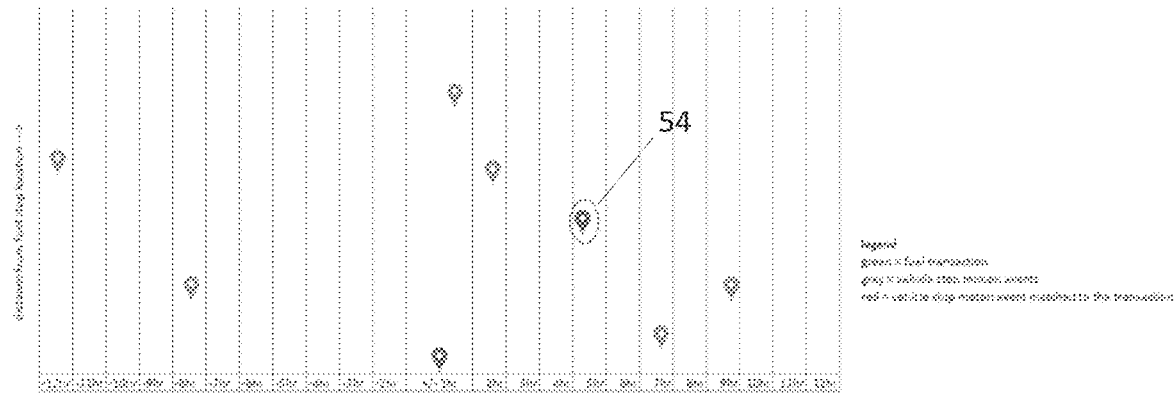
FIG. 3C is the graph of FIG. 3B, showing the selection of a vehicle stops closest in time to the purchase time, from among the chosen stops of FIG. 3B.

Referring, now, to FIGS. 3A-3C, in decision box 20 it might be detected that for a particular purchase transaction record a system user has chosen to use the best match algorithm, by checking box 48 (FIG. 2). In a preferred embodiment, all vehicle stops 50 within a time window of 12 hours plus or minus the recorded purchase record time are considered, and a set including the four (4) closest vehicle stop locations 52 during this period is formed (block 28), as shown in FIG. 3B. In other preferred embodiments, a different length time window is used and a different number of closest vehicle stops are entered into the set. The set member 52 closest in time to the record purchase time 54 is chosen as the best match (block 30) and returned to the user, together with data describing that vehicle stop, for further analysis (block 13).

In a preferred embodiment, the data displayed to the user at block 13 includes vehicle identification and driver identification, the difference in time and location between the selected vehicle stop and the purchase time and location, and the location of both the vehicle stop and the purchase. This permits a quick, human check on the correctness of the match. In some cases, fuel level before and after the vehicle stop is available and is included in the data made available to the user. For a fuel purchase, this permits a quick check on the match between vehicle stop and fuel purchase, because when there is no change in fuel level it is clear that the vehicle stop did not, in fact, match to the fuel purchase. In one preferred embodiment, only vehicle stops showing an increase in fuel level roughly matching the purchase receipt are considered in the analysis. The user can run the case (purchase record) again, with different parameters, when it can be shown that the vehicle stop noted was not, in fact, related to the purchase. In one preferred embodiment, the user can exclude a vehicle stop from consideration when looking anew for the correct vehicle stop to match to a purchase record. In another preferred embodiment, after a candidate vehicle stop is chosen, the system 10 checks to see if there is fuel level data and if there is not a change in fuel level, seeks another vehicle stop.

Figure 4:
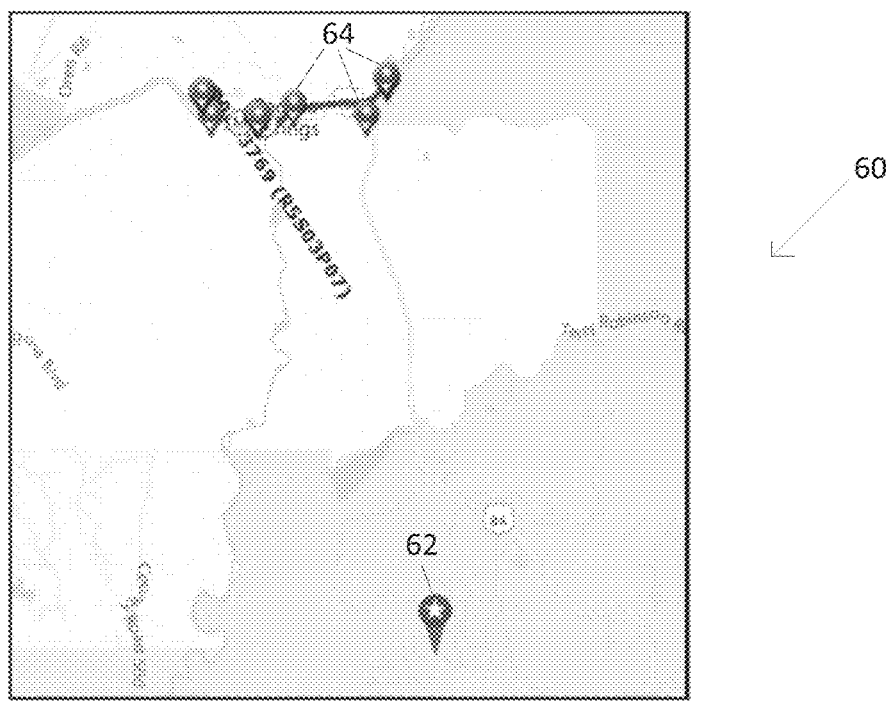
FIG. 4 shows a map of both vehicle stops and purchase location.

Referring now to FIG. 4, in a preferred embodiment, a mapping option 60 is also available, where a display having both the purchase location 62 and the vehicle stop locations 64 is shown. In the example shown, it appears unlikely that any of the vehicle stop locations correctly match to the fuel station location. But the purchase location 62 is itself suspect, being located on a very minor forest road. In one embodiment, the purchase records may be displayed in a list, with every list entry having an icon (such as a magnifying glass), which, when clicked produces the map mode shown in FIG. 4. When a fuel station location is found to be suspect, the user may find the actual location of the station through other means. For example, he may find vehicle stop locations that are long enough in time duration to fit a fueling stop, and investigate further. Or he may consult a satellite view or interview a truck driver. When the user does determine the actual location to associate with a station name, he may enter it into a dialogue box, thereby causing the entered geo coordinates to be used for that station in the future.

As noted above, FIG. 5 is a functional block diagram 31 illustrating the functional elements of an exemplary embodiment, implementing method 10 of FIG. 1. In greater detail, each fleet vehicle is equipped with sensors 33 configured to collect the required metrics, including an ignition key on/off indicator bit, as noted above. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above are executed by the remote computing device 39. CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, remote computing device 39 is equipped with a display. In a preferred embodiment, expense card transaction records 41 are input into computing device 39 as a comma separated values file. Records 41 may be received in an Email, or downloaded from a website, from a computer owned and operated (or otherwise utilized) by the company offering and servicing the expense card.

In a further embodiment, an "investigate further" or "don't investigate further" advisory is displayed to a human user for every purchase record. In an additional embodiment, a "no fraud" certainty indicator is provided to the human user.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of improving detection of fraudulent fuel-card charges by automatically matching a past expense card transaction record, having fuel station name, address and purchase time information, with a vehicle stop for a fleet vehicle, indicating that further fraud detection analysis may be unnecessary, comprising:
    maintaining a repository of vehicle trip information, by constantly tracking the fleet vehicle, through repeatedly receiving location information from the fleet vehicle and storing it in the repository;
    automatically detecting instances of the vehicle stopping for longer than a user specified time duration;
    automatically finding fuel station geographical coordinates corresponding to the fuel station name;
    automatically evaluating the vehicle stops closest in time and location to the purchase time and fuel station geographical coordinates of the past expense card transaction record of historical expense card transactions already fulfilled and stored in a database; and
    displaying to a user an information set, based on the evaluation, that facilitates a user decision as to whether to perform further fraud detection analysis, wherein the step of automatically evaluating the vehicle stops includes an evaluation of the likelihood that the fuel purchase record represents a fraudulent purchase, and the information set includes an indication field that is set to a predetermined value when the evaluation indicates that further investigation is warranted.

2. The method of claim 1, wherein the information set includes a vehicle stop that best fits a set of criteria as matching the expense card transaction record.

3. The method of claim 2, wherein the set of criteria are a time and a distance window set by a user about the purchase time and fuel station geographical coordinates, respectively.

4. The method of claim 2, wherein the set of criteria comprises, from among a set of geographically closest vehicle stops within a default time window of the purchase time, the vehicle stop closest in time to the purchase time.

5. The method of claim 1, wherein the fuel station geographical coordinates for the fuel station name are stored on computer readable memory and the step of automatically finding fuel station geographical coordinates comprises accessing the stored fuel station geographical coordinates for the fuel station name.

6. The method of claim 1, wherein the step of automatically finding fuel station geographical coordinates comprises accessing a computer program that translates the fuel station address into geographical coordinates.

7. The method of claim 6, wherein the computer program is a third-party map program which is accessed over the Internet.

8. The method of claim 6, wherein the geographical coordinates found by the computer program are stored on computer readable media as the geographical coordinates for the fuel station.

9. The method of claim 1, wherein the best match vehicle stop location is tentative and wherein fuel level information is available for the best match vehicle stop, and wherein a check is automatically performed to verify that fuel was received during the best match vehicle stop.

10. The method of claim 1, wherein fuel level information is available, and wherein the information set includes information regarding change in fuel level at the closest vehicle stops.

11. A system for improving detection of fraudulent fuel-card charges by automatically matching an expense card transaction record, having fuel station name, address and purchase time information, with a vehicle stop, indicating that further fraud detection analysis may be unnecessary, comprising:
    a repository of vehicle trip information, acquired by tracking the vehicle through repeatedly receiving and storing location information from the fleet vehicle on computer readable media;
    a computer data input mechanism for accepting a data file;
    a computer mechanism for acquiring the geographical coordinates of a fuel station, from the station address;
    a data processor, including computer readable non-transitory memory having a program that:
    reads in a data file having past fuel card expense transactions that are historical and that are already fulfilled and stored in a database; for each transaction:
    automatically detecting instances of the vehicle stopping for longer than a specified time duration; and
    automatically evaluating the vehicle stops closest in time and location to the purchase time and fuel station geographical coordinates; and
    displaying to a user an information set, based on the evaluation, that facilitates a user decision as to whether to perform further fraud detection analysis, wherein the step of automatically evaluating the vehicle stops includes an evaluation of the likelihood that the fuel purchase record represents a fraudulent purchase, and the information set includes an indication field that is set to a predetermined value when the evaluation indicates that further investigation is warranted.

12. The system of claim 11, wherein the information set includes a vehicle stop that best fits a set of criteria as matching the expense card transaction record.

13. The system of claim 12, wherein the set of criteria are a time and a distance window set by a user about the purchase time and fuel station geographical coordinates, respectively.

14. The system of claim 12, wherein the set of criteria comprises, from among a set of geographically closest vehicle stops within a default time window of the purchase time, the vehicle stop closest in time to the purchase time.

15. The system of claim 11, wherein the mechanism for translating the station address into geographical coordinates for the station first determines if fuel station geographical coordinates for the fuel station name are stored on the computer readable memory and if they are accessing those geographical coordinates for use by the data processor and if not, accessing a third-party maps program over the Internet to find the station geographical coordinates.

16. Non-transitory computer readable memory, which when implemented on a computer that maintains a repository of vehicle location information for a fleet vehicle and which has access to the geographical location for a fuel station at which an expense card transaction of historical expense card transactions already fulfilled and stored in a database was made in the past for improving detection of fraudulent fuel-card charges:
   automatically detects instances of the vehicle stopping for longer than a specified time duration;
   automatically evaluates the vehicle stops closest in time and location to the purchase time and fuel station geographical coordinates; and
   displays to a user an information set, based on the evaluation, that facilitates a user decision as to whether to perform further fraud detection analysis, wherein the step of automatically evaluating the vehicle stops includes an evaluation of the likelihood that the fuel purchase record represents a fraudulent purchase, and the information set includes an indication field that is set to a predetermined value when the evaluation indicates that further investigation is warranted.

17. The non-transitory computer readable memory of claim 16, wherein the information set includes a vehicle stop that best fits a set of criteria as matching the expense card transaction record.

18. The non-transitory computer readable memory of claim 17, wherein the set of criteria are a time and a distance window set by a user about the purchase time and fuel station geographical coordinates, respectively.

* * * * *